United States Patent
Sheriff et al.

(10) Patent No.: US 8,169,945 B2
(45) Date of Patent: *May 1, 2012

(54) MAINTAINING NETWORK CONNECTIVITY

(75) Inventors: Irfan Sheriff, San Jose, CA (US);
Robert Greenwalt, Redwood City, CA (US); Winthrop Saville, Soquel, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/249,280

(22) Filed: Sep. 30, 2011

(65) Prior Publication Data

US 2012/0020300 A1 Jan. 26, 2012

Related U.S. Application Data

(63) Continuation of application No. 12/877,903, filed on Sep. 8, 2010.

(60) Provisional application No. 61/355,618, filed on Jun. 17, 2010.

(51) Int. Cl.
H04B 7/14 (2006.01)
H04W 4/00 (2009.01)
H04Q 7/20 (2006.01)
G06F 15/16 (2006.01)

(52) U.S. Cl. ........ 370/315; 370/331; 370/352; 370/401; 709/221; 709/224; 709/227; 455/437; 455/450; 455/510

(58) Field of Classification Search .......... 370/241–401; 455/41.2, 405–510; 709/221–227; 725/34, 725/44, 105–131
See application file for complete search history.

(56) References Cited

U.S. PATENT DOCUMENTS

| 7,010,300 | B1 | 3/2006 | Jones et al. |
| 2006/0069782 | A1 | 3/2006 | Manning et al. |
| 2007/0291786 | A1 | 12/2007 | Maes |
| 2008/0102832 | A1 | 5/2008 | Sengupta et al. |
| 2008/0125041 | A1 | 5/2008 | Angelhag et al. |

(Continued)

FOREIGN PATENT DOCUMENTS

WO 2008011542 A1 1/2008

OTHER PUBLICATIONS

Munish, What's So Hot About BlackBerry Device Software v5.0?, Blog, Oct. 24, 2009, 12 pp. http://www.blackberrytune.com/whats-so-hot-about-blackberry-device-software-v5-0/.

(Continued)

*Primary Examiner* — Afsar M. Qureshi
(74) *Attorney, Agent, or Firm* — Shumaker & Sieffert, P.A.

(57) ABSTRACT

A network device may select between two or more network connections based on a determination of whether the network device can access general Internet resources via an available, higher-preference network without providing additional (e.g., OSI Model Layer Seven) login credentials. In one example, a network device includes a first network interface configured to maintain a connection to a first network gateway, a second network interface configured to connect to a second, different network gateway upon determining that the second network gateway is both available and preferable over the first network gateway, and means for determining whether a remote network resource is currently accessible via the second network gateway. When the remote network resource is accessible via the second network gateway, the second network interface maintains the connection to the second network gateway.

16 Claims, 6 Drawing Sheets

U.S. PATENT DOCUMENTS

| | | | |
|---|---|---|---|
| 2008/0261565 A1 | 10/2008 | Kunz et al. | |
| 2009/0124284 A1 | 5/2009 | Scherzer et al. | |
| 2010/0023609 A1* | 1/2010 | Vangala et al. | 709/221 |
| 2010/0040016 A1* | 2/2010 | Lor et al. | 370/331 |
| 2010/0115083 A1* | 5/2010 | Oba et al. | 709/224 |

OTHER PUBLICATIONS

Captive Portal, Academic dictionaries and encyclopedias, Accessed Aug. 23, 2010, 3 pp. http://en.academic.ru/dic.nsf/enwiki/294319.

Tim Cranny, Network World, How Wi-Fi hotspots force you to log in, Feb. 12, 2007, 3 pp. http://www.networkworld.com/columnists/2007/021207-wireless-security.html.

Logging into a corporate captive portal with a native iPhone app, last updated May 26, 2010, 3 pp. http://stackoverflow.com/questions/959266/logging-into-a-corporate-captive-portal-with-a-native-iphone-app.

Configuring AnyConnect Features, Accessed Aug. 23, 2010, 21 pp. http://www.cisco.com/en/US/docs/security/vpn_client/anyconnect/anyconnect25/administration/guide/ac03features.html.

U.S. Appl. No. 12/877,903, by Irfan Sheriff, filed Sep. 8, 2010.

"3rd Generation Partnership Project; Technical Specification Group Services and System Aspects; Multi access PDN connectivity and IP flow mobility (Release 9)," 3rd Generation Partnership Project, vol. 1.0, Nov. 1, 2008, 14 pp.

Invitation to Pay Additional Fees for corresponding international application No. PCT/US2011/040178, dated Oct. 25, 2011, 9 pp.

International Search Report and Written Opinion of International Application No. PCT/US2011/040178, mailed Feb. 8, 2012, 20 pp.

* cited by examiner

MAINTAINING NETWORK CONNECTIVITY

This application is a continuation of U.S. application Ser. No. 12/877,903, filed Sep. 8, 2010 which claims the benefit of priority of U.S. Provisional Application No. 61/355,618, filed Jun. 17, 2010, the entire contents of each of which are incorporated by reference herein.

TECHNICAL FIELD

This disclosure relates to network devices which may be mobile network devices, such as cellular phones with Internet connectivity.

BACKGROUND

Some network devices are capable of connecting to a network using a variety of different connection types. Mobile network devices, for example, are typically capable of connecting to a variety of different networks such as, for example, International Mobile Telecommunications-2000 (IMT-2000) or "3G" networks, enhanced data rates for GSM evolution (EDGE) networks (also referred to as TDMA single-carrier (IMT-SC)), CDMA multi-carrier (IMT-MC) CDMA Direct Spread (IMT-DS), wireless local area networks (WLANs) also referred to as Wi-Fi™ networks, Worldwide Interoperability for Microwave Access (WiMAX) networks, or other networks. Such mobile devices are often configured with ordered preferences of these networks, such that the mobile device connects to the most preferable network that is available. One common configuration, for example, is to connect to a Wi-Fi network if available, else connect to a 3G network if available, else connect to an EDGE network. Mobile devices may be configured to automatically connect to a higher-preference network when the higher-preference network is detected.

In some instances, an network gateway, e.g., a wireless access point, a server associated with a device that provides connectivity to a network, or other gateway device, of a particular network permits mobile network devices to connect to the network gateway, but in response to data requests, directs the mobile network devices to a login page. For example, some hotels and airports provide wireless network connectivity only to users who agree to pay to access the network. Although a mobile device may be able to connect to the network gateway, unless a user of the mobile device agrees to pay for network access via the network gateway or otherwise provide additional login credentials, network resources beyond the network gateway (e.g., the Internet at large) are inaccessible to the mobile device via the network gateway.

SUMMARY

In one example, a method includes maintaining, by a network device, a connection to a first network gateway. The method also includes determining that a second, different network gateway is both available and preferable over the first network gateway. The method also includes connecting, by the network device, to the second network gateway while maintaining the connection to the first network gateway. The method further includes determining that an application on the mobile device can access a remote network resource through the second network gateway. The method also includes maintaining the connection to the second network gateway based on the determination that the application can access the remote network resource.

In another example, a mobile device includes a first network interface configured to maintain a connection to a first network gateway. The mobile device also includes a control unit configured to determine that a second, different network gateway is both available and preferable over the first network gateway. The mobile device also includes a second network interface configured to connect to the second network gateway while the first network interface maintains the connection to the first network gateway. The network device further includes means for determining that an application on the mobile device can access a remote network resource through the second network gateway. The second network interface is configured to maintain the connection to the second network gateway based on the determination that the application can access the remote network resource.

In another example, a computer-readable medium, such as a computer-readable storage medium, contains, e.g., is encoded with, instructions that, when executed, cause a processor of a mobile device to maintain a connection to a first network gateway. The instructions also cause the processor to determine that a second, different network gateway is both available and preferable over the first network gateway. The instructions also cause the processor to connect to the second network gateway while maintaining the connection to the first network gateway. The instructions further cause the processor to determine that an application on the mobile device can access a remote network resource through the second network gateway. The instructions also cause the processor to maintain the connection to the second network gateway based on the determination that the application can access the remote network resource.

In another example, a method includes maintaining, by a mobile device, a connection to a first network gateway, determining that a second, different network gateway is both available and preferable over the first network gateway, connecting, by the mobile device, to the second network gateway while maintaining the connection to the first network gateway, and determining whether an application on the mobile device can access a remote network resource through the second network gateway. When the remote network resource is not determined to be currently accessible through the second network gateway, the method comprises displaying a prompt for authentication credentials for the second network gateway, waiting to receive the authentication credentials, disconnecting from the second network gateway when the authentication credentials are not received after a predetermined amount of time, and providing the authentication credentials to the second network gateway upon receiving the authentication credentials within the predetermined amount of time. When the remote network resource is determined to be currently accessible through the second network gateway, the method comprises maintaining the connection to the second network gateway based on the determination that the application can access the remote network resource and disconnecting from the first network gateway.

In another example, a method includes maintaining, by a mobile device, a connection to a first network gateway, determining that a second, different network gateway is both available and preferable over the first network gateway, connecting, by the mobile device, to the second network gateway while maintaining the connection to the first network gateway, determining that an application on the mobile device cannot access a remote network resource through the second network gateway, and displaying a prompt for authentication credentials for the second access gateway based on the determination that the application cannot access the remote network resource.

In another example, a mobile device includes a first network interface configured to maintain a connection to a first network gateway; a control unit configured to determine that a second, different network gateway is both available and preferable over the first network gateway, a second network interface configured to connect to the second network gateway while the first network interface maintains the connection to the first network gateway; and means for determining that an application on the mobile device can access a remote network resource through the second network gateway, wherein the second network interface is configured to maintain the connection to the second network gateway based on the determination that the application can access the remote network resource.

The techniques of this disclosure may provide one or more advantages. For example, these techniques may cause a network device, such as a mobile device, to be able to maintain connectivity to a network, such as the Internet, when attempting to switch to a new access network. That is, after determining that a network is available, the mobile device may determine whether network resources beyond the network are available before maintaining a connection to the network. Thus although the mobile device may be able to connect to the network, the mobile device may further determine whether to remain connected to the network based on whether resources external to the network (such as an e-mail server, a web site, or other network resources) are available via the network.

The details of one or more examples are set forth in the accompanying drawings and the description below. Other features, objects, and advantages will be apparent from the description and drawings, and from the claims.

DETAILED DESCRIPTION

In general, this disclosure describes techniques for maintaining network connectivity for mobile devices, such as, for example, cellular telephones that are capable of accessing computer networks such as the Internet. An example mobile device may be configured to automatically connect to higher-preference networks when determined to be available. However, in accordance with the techniques of this disclosure, the mobile device may determine whether a resource that is external to the higher-preference network is accessible via the higher-preference network.

By doing so, the mobile device may determine whether general Internet access is available via the higher-preference network. If so, the mobile device may initiate new network sessions on the higher-preference network, and in some examples, transfer existing network sessions from the previous network to the higher-preference network. On the other hand, when the resource external to the higher-preference network is not accessible via the higher-preference network, the mobile device may disconnect from the higher-preference network and continue to utilize the original network. In some examples, rather than disconnecting, the mobile device may obtain login credentials from the user in order to establish network connections via the higher-preference network.

Figure 1:
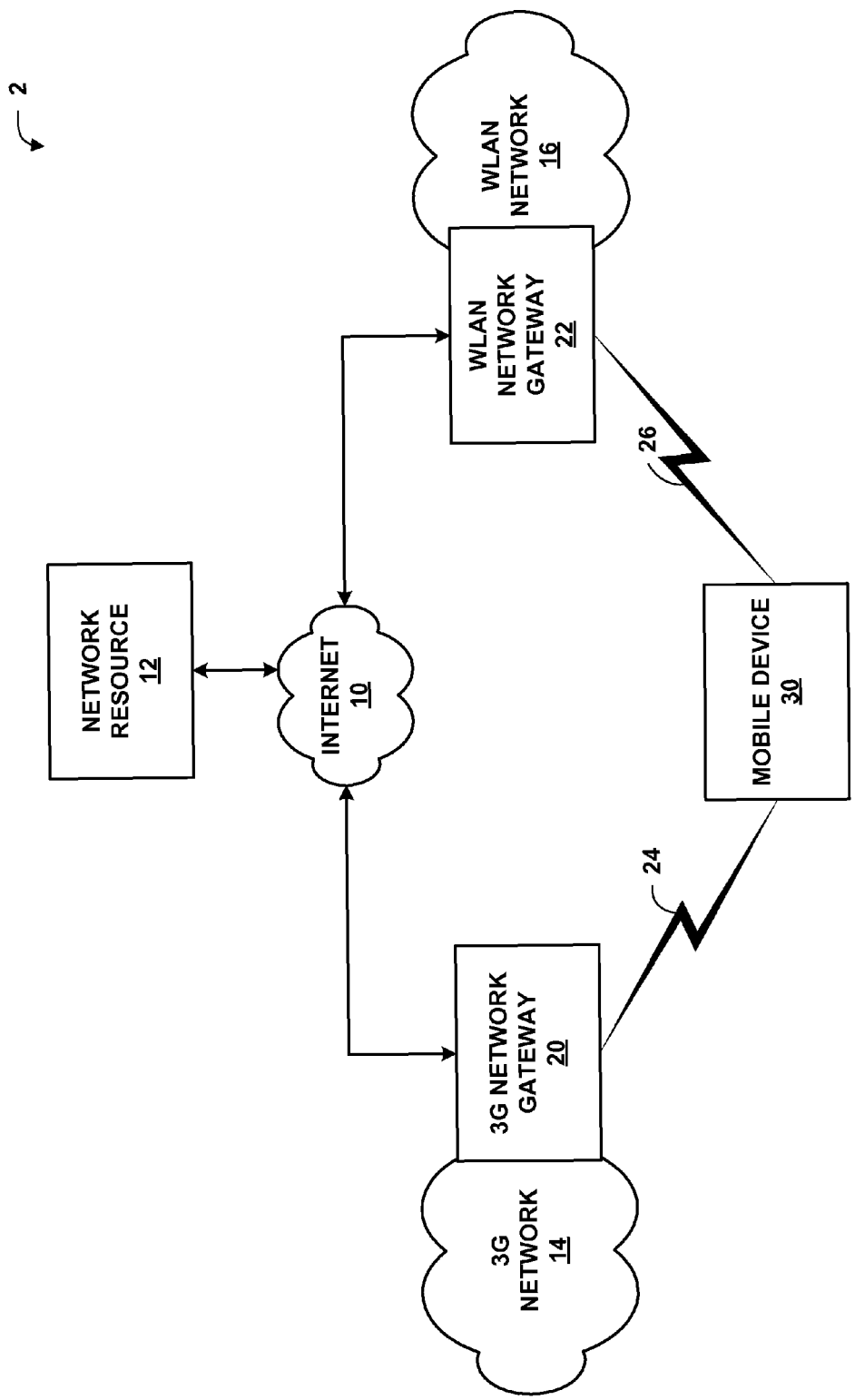
FIG. 1 is a block diagram illustrating an example system in which a mobile device is able to connect to either a 3G network gateway or a wireless local area network (WLAN) network gateway.

FIG. 1 is a block diagram illustrating an example system 2 in which Mobile Device 30 is able to connect to either 3G Network Gateway 20 or wireless local area network (WLAN) network Gateway 22. Although described primarily with respect to 3G and WLAN for purposes of example, it should be understood that the techniques of this disclosure may be applied to any two or more networks, which may be of different types. In the example of FIG. 1, system 2 includes Mobile Device 30, 3G Network Gateway 20, WLAN Network Gateway 22, and Network Resource 12. 3G Network Gateway 20 and WLAN Network Gateway 22 provide access to resources, such as Network Resource 12, via Internet 10. In accordance with the techniques of this disclosure, Mobile Device 30 selects between connecting to 3G Network Gateway 20 and WLAN Network Gateway 22 to gain access to resources of Internet 10. Network gateways may correspond to, for example, wireless access points, servers associated with networks, or other gateway devices.

Internet 10 corresponds to the Internet, which includes various network devices, such as routers, switches, bridges, hubs, gateways, security devices such as firewalls and intrusion prevention devices, web servers, database servers, file servers, workstations, mobile devices, and other network devices. 3G Network 14 and WLAN network 16 may include similar network devices as well. Mobile device 30 generally connects to an network gateway, such as 3G Network Gateway 20 or WLAN Network Gateway 22, to gain access to Internet 10. In particular, Mobile Device 30 sends data requests and responses to resources of Internet 10, such as Network Resource 12, via at least one network gateway.

Network resource 12 corresponds to a network resource that is external to WLAN Network Gateway 22 and WLAN network 16. In general, a resource is considered to be external to a network, for the purposes of this disclosure, when the access to the resource implies that access to Internet 10 is generally available. In some examples, network gateways that provide "walled gardens" allow connecting devices to connect to certain resources, but not to the Internet generally. For example, airport network gateways may allow connections to airlines' web pages, but not to search engines or other general purpose Internet resources without additional login credentials. Similarly, a hotel may allow connections to the hotel's website, but not to general purpose Internet resources without additional login credentials.

3G Network Gateway 20 may provide access to resources of 3G Network 14 for mobile devices, such as Mobile Device 30. Although shown in the example of FIG. 1 as connecting to Internet 10, 3G Network Gateway 20 may direct traffic received from Mobile Device 30 to other network devices of 3G Network 14, such as, for example, a router that then directs the traffic to Internet 10 generally. Similarly, WLAN Network Gateway 22 may provide access to Internet 10 via network devices of WLAN network 16, and in some cases, provides this access only to devices that provide satisfactory authentication credentials.

Mobile device 30 is configured with a set of network connection preferences that indicate which of a variety of available network connections Mobile Device 30 will establish in a particular area. One example set of connection preferences is that a WLAN connection (also referred to as a Wi-Fi connection) is most preferred, a 3G connection is preferred next (that is, if the WLAN connection is not available), and then an enhanced data rates for GSM evolution (EDGE) connection is preferred if neither the WLAN nor the 3G connections are available. In other examples, Mobile Device 30 may include other configurations, e.g., preferences for one or more of 3G, 4G, EDGE, Wi-Fi™, WiMax, Bluetooth®, or other network connection types. Accordingly, system 2 may include network gateways for any or all of 3G, 4G, EDGE, Wi-Fi, WiMax, Bluetooth, or other network connection types.

Mobile device 30 initially establishes an International Mobile Telecommunications-2000 (IMT-2000), referred to in this disclosure as a "3G," connection 24 with 3G Network Gateway 20. Although only one 3G network gateway is illustrated in FIG. 1, it should be understood that system 2 may include any number of 3G network gateways, and Mobile Device 30 may connect to any of the 3G network gateways. In general, as Mobile Device 30 moves between various locations, Mobile Device 30 establishes 3G connections similar to 3G Connection 24 with various 3G network gateways.

In accordance with the techniques of this disclosure, Mobile Device 30 may determine whether to connect to 3G Network Gateway 20 or WLAN Network Gateway 22 to gain access to resources of Internet 10. FIG. 1 portrays an example in which Mobile Device 30 is able to connect to either or both of 3G Network Gateway 20 or WLAN Network Gateway 22. Mobile device 30, in this example, is configured such that WLAN network gateways are preferred over 3G network gateways. Accordingly, Mobile Device 30 automatically establishes WLAN Connection 26 with WLAN Network Gateway 22 when Mobile Device 30 determines that connection to WLAN Network Gateway 22 is possible. However, in accordance with the techniques of this disclosure, Mobile Device 30 determines whether WLAN Network Gateway 22 provides access to Internet 10 generally, or whether instead WLAN Network Gateway 22 provides access to Internet 10 only after receiving additional login credentials. Network gateways that enable devices to connect to the network gateways, but only provide general access to Internet 10 after additional credentials have been received, may be referred to as providing a walled garden in this disclosure. Thus network gateways that require login credentials to be provided at the application layer (layer seven of the Open System Interconnection (OSI) model may be considered to provide a walled garden.

This disclosure refers to authentication credentials as login credentials that would be requested by a process at the application layer, or layer seven, of the OSI standard network model. That is, the credentials may include, for example, a user identification and a password. Although WLAN Network Gateway 22 may also require credentials in the form of, for example, a wired equivalent privacy (WEP) key or a Wi-Fi Protected Access (WPA) key, such keys are generally required to initially connect to WLAN Network Gateway 22. This disclosure generally intends references to the required credentials (or additional credentials) as credentials requested by WLAN Network Gateway 22 or other network gateways after having established a connection to the network gateway.

Network gateways, such as WLAN network gateways (e.g., wireless routers, servers, security devices, etc.), that provide a walled garden typically require user authentication and/or authorization before granting access to resources of Internet 10 generally. So before a user has provided authentication credentials, the network gateway (or a server coupled to the network gateway) may intercept such requests. In some cases, WLAN network gateways require authentication to prevent malicious users or automated software agents from accessing resources of a network protected by the WLAN network gateways. For example, WLAN Network Gateway 22 may require authentication credentials to protect resources of WLAN network 16. WLAN network gateways may also require authorization to restrict access to Internet 10 to only those customers who have purchased a usage license.

Connections to such WLAN network gateways are possible without the additional login credentials, but the WLAN network gateways, or servers associated with the WLAN network gateways, intercept certain messages, such as connection attempts, to resources beyond the WLAN network gateways. The WLAN network gateways may respond to connection attempts to resources beyond the WLAN network gateways by directing Mobile Device 30 to a different Internet protocol (IP) address than was requested, e.g., a website that enables a user to provide the required credentials. In this manner, such WLAN network gateways or other network gateways that provide a walled garden restrict access to resources external to the network gateways, such as, for example, Network Resource 12, and permit access to these resources only after successful authentication.

Mobile devices, such as cellular telephones with Internet access, are often configured to periodically or continuously access Internet resources even when users are not actively using the mobile devices. Mobile device 30, for example, may be configured to periodically check an e-mail server residing on Internet 10 to check for new e-mails directed to an e-mail account of the user of Mobile Device 30. That is, Mobile Device 30 may be configured to periodically execute one or more of the Post Office Protocol (POP), the Internet Message Access Protocol (IMAP), or other e-mail protocols, to check for new e-mails. While Mobile Device 30 is connected to 3G Network Gateway 20 via 3G Connection 24, execution of such e-mail protocols is possible, as 3G Network Gateway 20 provides access to Internet 10 generally, and accordingly, a corresponding e-mail server. Network resource 12 may correspond to the e-mail server for Mobile Device 30 or another known resource.

Mobile device 30 utilizes certain techniques of this disclosure to determine whether, in the example above, to maintain WLAN Connection 26 when WLAN Network Gateway 22 is accessible. Rather than blindly connecting to WLAN Network Gateway 22 with the expectation that if WLAN Connection 26 is successfully established, connections to resources beyond WLAN Network Gateway 22 will be successful, Mobile Device 30 first determines whether WLAN Network Gateway 22 provides a walled garden and requires additional login credentials before granting access to resources of Internet 10. When WLAN Network Gateway 22 does require additional login credentials, Mobile Device 30 may prompt a user for the additional login credentials or automatically reestablish (or maintain) 3G Connection 24, despite being configured to prefer WLAN connections over 3G connections (in this example).

In this manner, Mobile Device 30 may, for example, avoid missing e-mails or other data that are retrieved from a resource beyond WLAN Network Gateway 22, which may otherwise occur when WLAN Network Gateway 22 requires additional login credentials. That is, while Mobile Device 30 is not being actively used by a user, the user may not realize that Mobile Device 30 does not have access to resources of Internet 10 beyond WLAN Network Gateway 22. Thus Mobile Device 30 may, upon determining that WLAN Network Gateway 22 provides a walled garden, immediately or within a certain period of time from making the determination, automatically reestablish 3G Connection 24 or maintain 3G Connection 24 and drop WLAN Connection 26.

In accordance with certain techniques of this disclosure, Mobile Device 30 determines whether WLAN Network Gateway 22 requires authentication to access resources of Internet 10. In general, Mobile Device 30 determines whether resources of Internet 10 are generally accessible via WLAN Network Gateway 22. That is, rather than blindly connecting to WLAN Network Gateway 22 and attempting to continue existing network sessions via WLAN network gateway, Mobile Device 30 first determines whether Network Resource 12, which is external to WLAN Network Gateway 22, is accessible via WLAN Network Gateway 22.

One or more techniques of this disclosure may provide various methods for determining whether resources of Internet 10 are accessible via WLAN Network Gateway 22. Network resource 12 may include a known network resource, e.g., a web page that Mobile Device 30 attempts to access using a known Uniform Resource Locator (URL), such as www.google.com. That is, Mobile Device 30 may be configured with an expected result for Network Resource 12. Accordingly, Mobile Device 30 may, upon establishing WLAN Connection 26 with WLAN Network Gateway 22, attempt to retrieve data from Network Resource 12 via WLAN Network Gateway 22. When the response to this attempt matches the expected result, Mobile Device 30 determines that access to Internet 10 generally is possible via WLAN Connection 26. On the other hand, when the result does not match the expected result, Mobile Device 30 may determine that WLAN Network Gateway 22 provides a walled garden, and thus requires additional credentials to access Internet 10.

As another example, Mobile Device 30 may ping Network Resource 12 via WLAN Network Gateway 22 to determine whether resources of Internet 10 are accessible via WLAN Network Gateway 22. That is, Mobile Device 30 may be configured to issue an echo request in accordance with the Internet Control Message Protocol (ICMP) to Network Resource 12. Network resource 12 may be configured to respond to ICMP echo requests with an ICMP response. If so, Network Resource 12 may respond to an ICMP request with an ICMP response. When Mobile Device 30 receives an ICMP response from Network Resource 12 after issuing an ICMP echo request to Network Resource 12, Mobile Device 30 may determine that WLAN Network Gateway 22 provides access to Internet 10 without additional login credentials. On the other hand, when Mobile Device 30 does not receive the ICMP response, Mobile Device 30 may determine that WLAN Network Gateway 22 provides a walled garden.

As yet another example, Mobile Device 30 may be configured with an IP address of Network Resource 12. Thus, to determine whether WLAN Network Gateway 22 provides a walled garden, Mobile Device 30 may issue a domain name system (DNS) request for Network Resource 12. When Mobile Device 30 receives an IP address in response to the DNS request, Mobile Device 30 compares the response IP address to the known IP address of Network Resource 12. If the addresses match, Mobile Device 30 determines that access to Internet 10 via WLAN Network Gateway 22 is possible, otherwise Mobile Device 30 determines that access to Internet 10 is not possible via WLAN Network Gateway 22 without additional login credentials from the user.

In another example, Network Resource 12 may correspond to a server that supports hypertext transfer protocol secure (HTTP-S). Mobile device 30 may send an HTTP-S request to Network Resource 12 via WLAN Network Gateway 22. If Mobile Device 30 receives a response to the request from Network Resource 12, Mobile Device 30 may determine that resources of Internet 10 are available via WLAN Network Gateway 22. On the other hand, if Mobile Device 30 does not receive a response from Network Resource 12, Mobile Device 30 may determine that resources of Internet 10 are not available via WLAN Network Gateway 22.

As still another example, Mobile Device 30 may issue an HTTP Streaming request, e.g., an HTTP-GET or HTTP partial GET, request to Network Resource 12 via WLAN Network Gateway 22. When Mobile Device 30 receives the requested data in response to the GET or partial GET from Network Resource 12, Mobile Device 30 may determine that WLAN network gateway 10 provides access to Internet 10. On the other hand, when Mobile Device 30 does not receive the requested data, Mobile Device 30 may determine that WLAN network gateway 10 does not provide access to Internet 10 without additional credentials.

As another example, Mobile Device 30 may issue DNS requests to a number of different resources on Internet 10, one of which may include Network Resource 12. Mobile device 30 may then receive DNS responses to the DNS requests that provide a number of IP addresses. When WLAN Network Gateway 22 provides a walled garden, all of the DNS responses may resolve to the same IP address, namely the IP address of the login webpage by which a user must enter additional login credentials. Accordingly, Mobile Device 30 may compare the IP addresses received in response to the DNS requests to determine whether WLAN Network Gateway 22 provides access to Internet 10. That is, if at least two of the IP addresses are the same (assuming the corresponding DNS requests were directed to different resources), Mobile Device 30 may determine that WLAN Network Gateway 22 provides a walled garden. In some examples, Mobile Device 30 determines that WLAN network gateway provides a walled garden only when all of the received IP addresses are the same. On the other hand, when each of the IP addresses are different (or in some examples, when at least two of the IP addresses are different), Mobile Device 30 may determine that access to Internet 10 is possible via WLAN Network Gateway 22.

When Mobile Device 30 determines that WLAN Network Gateway 22 provides a walled garden, that is, that resources of Internet 10 beyond WLAN Network Gateway 22 are not generally available via WLAN Network Gateway 22 unless additional credentials or authorization is provided, Mobile Device 30 may terminate WLAN Connection 26 and reinitiate or maintain 3G Connection 24. In some examples, Mobile Device 30 may prompt a user for login credentials requested by WLAN Network Gateway 22. However, in recognition that Mobile Device 30 may not be in current use by the user when Mobile Device 30 establishes WLAN Connection 26, Mobile Device 30 may wait for the user to enter the login credentials for a period of time. If the period of time expires without receiving the login credentials, Mobile Device 30 may instead issue data requests via 3G Network Gateway 20 and disconnect from WLAN Network Gateway 22.

In some examples, Mobile Device 30 is configured to maintain two or more network connections simultaneously, that is, at substantially the same time. For example, Mobile Device 30 may maintain both 3G Connection 24 and WLAN Connection 26. When Mobile Device 30 is able to access resources of Internet 10 via WLAN Network Gateway 22 (e.g., either because WLAN Network Gateway 22 does not provide a walled garden or because the user has entered credentials that allow Mobile Device 30 to access Internet 10 via WLAN Network Gateway 22), Mobile Device 30 may maintain existing network sessions via 3G Network Gateway 20, while initiating new network sessions via WLAN Network Gateway 22. That is, Mobile Device 30 may continue to communicate data over network sessions that were established prior to establishing WLAN Connection 26 via 3G Network Gateway 20. However, after establishing WLAN Connection 26 and determining that resources of Internet 10 are available via WLAN Network Gateway 22, Mobile Device 30 may establish new network sessions with resources of Internet 10 via WLAN Network Gateway 22. In other examples, Mobile Device 30 may terminate existing network sessions and reestablish the terminated network sessions via WLAN Network Gateway 22.

Figure 2:
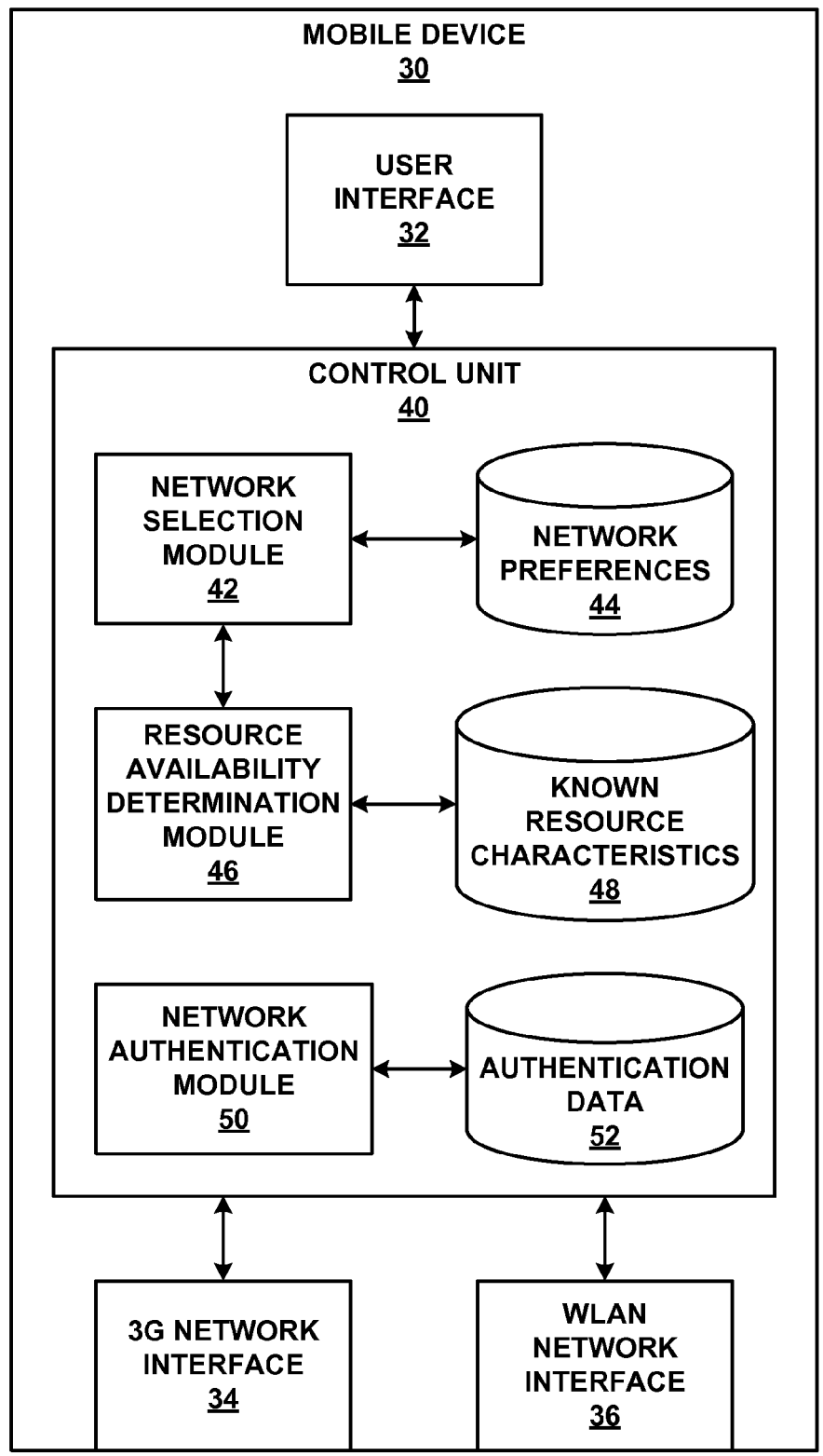
FIG. 2 is a block diagram illustrating an example set of components of an example mobile device.

FIG. 2 is a block diagram illustrating an example set of components of Mobile Device 30. In the example of FIG. 2, Mobile Device 30 includes User Interface 32, Control Unit 40, 3G Network Interface 34, and WLAN Network Interface 36. Control unit 40 includes Network Selection Module 42, Network Preferences 44, Resource Availability Determination Module 46, Known Resources 48, Network Authentication Module 50, and Authentication Data 52, in this example.

A user may interact with Mobile Device 30 using User Interface 32. User interface 32 may, in various examples, include one or more of a touchscreen display, a standard display, a keyboard, a speaker, a microphone, a tactile or haptic feedback unit such as a vibration motor or other vibrating mechanism, buttons, switches, and/or dials. The user may configure Mobile Device 30 via User Interface 32, e.g., to assign preferences to certain types of network connections over others. When Mobile Device 30 connects to an network gateway that provides a walled garden, Control Unit 40 may cause a display of User Interface 32 to display a prompt for additional credentials requested by the network gateway.

3G Network Interface 34 is generally configured to communicate data according to the 3G protocol. That is, 3G Network Interface 34 may communicate network session data at layers one and two (the physical layer and the data link layer) of the Open System Interconnection Reference Model (OSI Model) according to the 3G protocol. 3G Network Interface 34 may include hardware, software, and/or firmware such as, for example, an antenna, a transceiver, and a processing unit. 3G Network Interface 34 may be implemented as a discrete hardware unit, such as an application specific integrated circuit (ASIC) or field programmable gate array (FPGA), or may include a processor that executes instructions stored on a computer-readable storage medium of 3G Network Interface 34.

Similarly, WLAN Network Interface 36 is configured to communicate data according to a wireless protocol, such as one of the 802.11 protocols (e.g., 802.11 a/b/g/n). In the example of FIG. 2, 3G Network Interface 34 and WLAN network interface are illustrated as separate units only for purposes of discussion of the distinct functionality of communication according to various layer one and two protocols. In general, 3G Network Interface 34 and WLAN Network Interface 36 may include discrete, separate hardware units, or may share one or more components, such that 3G Network Interface 34 and WLAN Network Interface 36 may be functionally integrated.

Control unit 40 may include hardware, software, and/or firmware. For example, Network Selection Module 42 and Resource Availability Determination Module 46 may correspond to discrete hardware units, such as ASICS or FPGAs, a single hardware unit that performs the functionality attributed to both Network Selection Module 42 and Resource Availability Determination Module 46, or to a processor that executes instructions for Network Selection Module 42 and Resource Availability Determination Module 46. Network selection module 42 and Resource Availability Determination Module 46, when implemented in software, may be implemented as software objects (that is, data structures having member functions and/or member data) or as functions or procedures, and may be implemented as separate software modules or as a single software module. Control unit 40 may include a computer-readable storage medium that includes executable instructions for either or both of Network Selection Module 42 and/or Resource Availability Determination Module 46, as well as a processor to execute the instructions for Network Selection Module 42 and/or Resource Availability Determination Module 46.

Network selection module 42 interacts with 3G Network Interface 34 and WLAN Network Interface 36 to determine whether either or both a 3G network and a WLAN network are available. Network selection module 42 refers to Network Preferences 44 to determine preferences between various network connections. It is assumed for purposes of example that a WLAN network is preferable over a 3G network in the example of FIG. 2, although in other examples, additional and/or alternative network connection types may have assigned preferences in Network Preferences 44. Network preferences 44 may include a table stored in a memory of Control Unit 40 that lists various network connection types, along with a relative preference to the other network connection types. When both a 3G network and a WLAN network are available, Network Selection Module 42 determines whether Mobile Device 30 should connect to the WLAN network or the 3G network.

Under the assumption that the WLAN network is preferable over the 3G network, Control Unit 40 causes WLAN Network Interface 36 to initiate a connection to the WLAN network when a WLAN network is available. After connecting, Network Selection Module 42 causes Resource Availability Determination Module 46 to determine whether a resource external to a WLAN network gateway of the WLAN network is accessible. Resource Availability Determination Module 46 interacts with Known Resource Characteristics 48 to determine whether a resource beyond the WLAN network gateway is available.

Known Resource Characteristics 48 may include data stored in a memory of Control Unit 40. Known Resource Characteristics 48 may, for example, include a URL, an IP address, and/or an identifier of one or more known network resources. In this manner, after WLAN Network Interface 36 has established a network connection, such as WLAN Connection 26, with a WLAN network gateway, such as WLAN Network Gateway 22, Resource Availability Determination Module 46 may determine whether a known resource that is external to WLAN Network Gateway 22 is available via WLAN Network Gateway 22.

To determine whether the known resource is available via WLAN Network Gateway 22, Resource Availability Determination Module 46 may send a request to the known resource and determine whether a response is received, and if so, whether the response corresponds to expected data as stored by Known Resource Characteristics 48. For example, Resource Availability Determination Module 46 may implement ICMP to ping (that is, send an echo request) to the IP address of a known resource, implement the DNS protocol to perform an IP address lookup of a known resource, implement HTTP-S to send an HTTP-S request to a server implementing HTTP-S, submit an HTTP-GET request or HTTP partial GET, or use other mechanisms to retrieve a known resource.

In the ping and the asymmetric cryptography examples, Resource Availability Determination Module 46 generally determines that any response to the corresponding request indicates that the known resource is available via WLAN Network Gateway 22. With respect to the examples of submitting an IP address lookup and an HTTP-GET or partial GET, Resource Availability Determination Module 46 compares received responses to Known Resource Characteristics 48. When the responses match the corresponding elements of Known Resource Characteristics 48, Resource Availability Determination Module 46 determines that the resource is available via WLAN Network Gateway 22.

In another example, Resource Availability Determination Module 46 sends DNS requests to a number of different URLs and receives a number of IP addresses in response. Resource Availability Determination Module 46 compares the received IP addresses to each other and, when all or a portion of the received IP addresses are the same, determines that WLAN Network Gateway 22 provides a walled garden. In this example, Control Unit 40 need not include Known Resource Characteristics 48.

In some examples, when Resource Availability Determination Module 46 determines that the resource beyond WLAN Network Gateway 22 is not available, Resource Availability Determination Module 46 informs Network Selection Module 42 that the external resource is not available. Network selection module 42 may, in turn, select the 3G network, causing WLAN Network Interface 36 to terminate the WLAN connection and send all network session data via 3G Network Interface 34, despite a WLAN network gateway being accessible and preferable to the 3G network gateway.

In some examples, however, Network Selection Module 42 may cause Network Authentication Module 50 to attempt to authenticate Mobile Device 30 to the WLAN network gateway automatically. That is, Network Authentication Module 50 may provide credentials to the WLAN network gateway to authenticate with WLAN Network Gateway 22 that provides the walled garden. Authentication Data 52 contains, for example, credentials such as a username and password for various walled gardened networks. In this manner, Mobile Device 30 may automatically connect to WLAN Network Gateway 22 and provide the credentials to WLAN Network Gateway 22, without requiring that the user re-enter the credentials for WLAN Network Gateway 22 during subsequent connection attempts.

Authentication Data 52 may also store configuration data used by Network Authentication Module 50. For example, Authentication Data 52 may store configuration data defining a period of time to wait following prompting a user to enter login credentials for accessing the Internet via WLAN Network Gateway 22. Accordingly, Network Authentication Module 50 may alert the user that Mobile Device 30 has detected an network gateway that requires authentication credentials, then wait for the user to provide the credentials for the period of time defined by the configuration data of Authentication Data 52. If the period of time expires without receiving the requested credentials, Mobile Device 30 may disconnect from WLAN Network Gateway 22, and instead communicate with resources of Internet 10 via, for example, 3G Gateway 20.

Network Authentication Module 50 may alert the user in one or more ways, e.g., using an audible alert, a vibrational alert, a visual alert (e.g., opening a web page that includes fields for entering the credentials, or displaying a message indicating that the user has been requested to enter the credentials), or other types of alerts. That is, Network Authentication Module 50 may cause User Interface 32 to perform the alert. If the user does not provide the credentials within the period of time, Network Authentication Module 50 may send a message to Network Selection Module 42 that the user has not entered the credentials, and Network Selection Module 42, in turn, may cause WLAN Network Interface 36 to disconnect from WLAN Network Gateway 22.

Resource Availability Determination Module 46 may be configured to periodically perform the determination of whether a resource external to WLAN Network Gateway 22 is available, not just upon initially connecting to WLAN Network Gateway 22. For example, WLAN Network Gateway 22 may grant Mobile Device 30 and/or a user a temporary license that expires within a certain period of time. Accordingly, Resource Availability Determination Module 46 may be configured to periodically make such a determination, e.g., every hour or number of hours. The period of time between determinations may be configurable by a user and stored in a memory of Control Unit 40. If at some gateway the resource external to WLAN Network Gateway 22 is determined to no longer be available, Resource Availability Determination Module 46 may send a message to Network Selection Module 42 that indicates this determination of non-availability, and Network Selection Module 42 may cause WLAN Network Interface 36 to disconnect from the WLAN network gateway and cause 3G Network Interface 34 to establish a 3G network connection.

The example of Mobile Device 30 of FIG. 2 illustrates an example of a network device including a first network interface configured to maintain a connection to a first network gateway. The example network device also includes a second network interface configured to connect to a second, different network gateway upon determining that the second network gateway is both available and preferable over the first network gateway. The example network device further includes means for determining whether a resource external to the second network gateway is currently accessible via the second network gateway. When the resource external to the second network gateway is accessible via the second network gateway, the second network interface of the example network device maintains the connection to the second network gateway.

Although described primarily with respect to 3G and WLAN for purposes of example, it should be understood that the techniques described with respect to FIGS. 1 and 2 may be applied to any two or more networks, which may be of different network types. As such, Mobile Device 30 may include additional network interfaces for a variety of networks, which may correspond to different network types. Moreover, Mobile Device 30 may be configured to determine whether any type of network connection provides a walled garden, not just WLAN network gateways.

Figure 3:
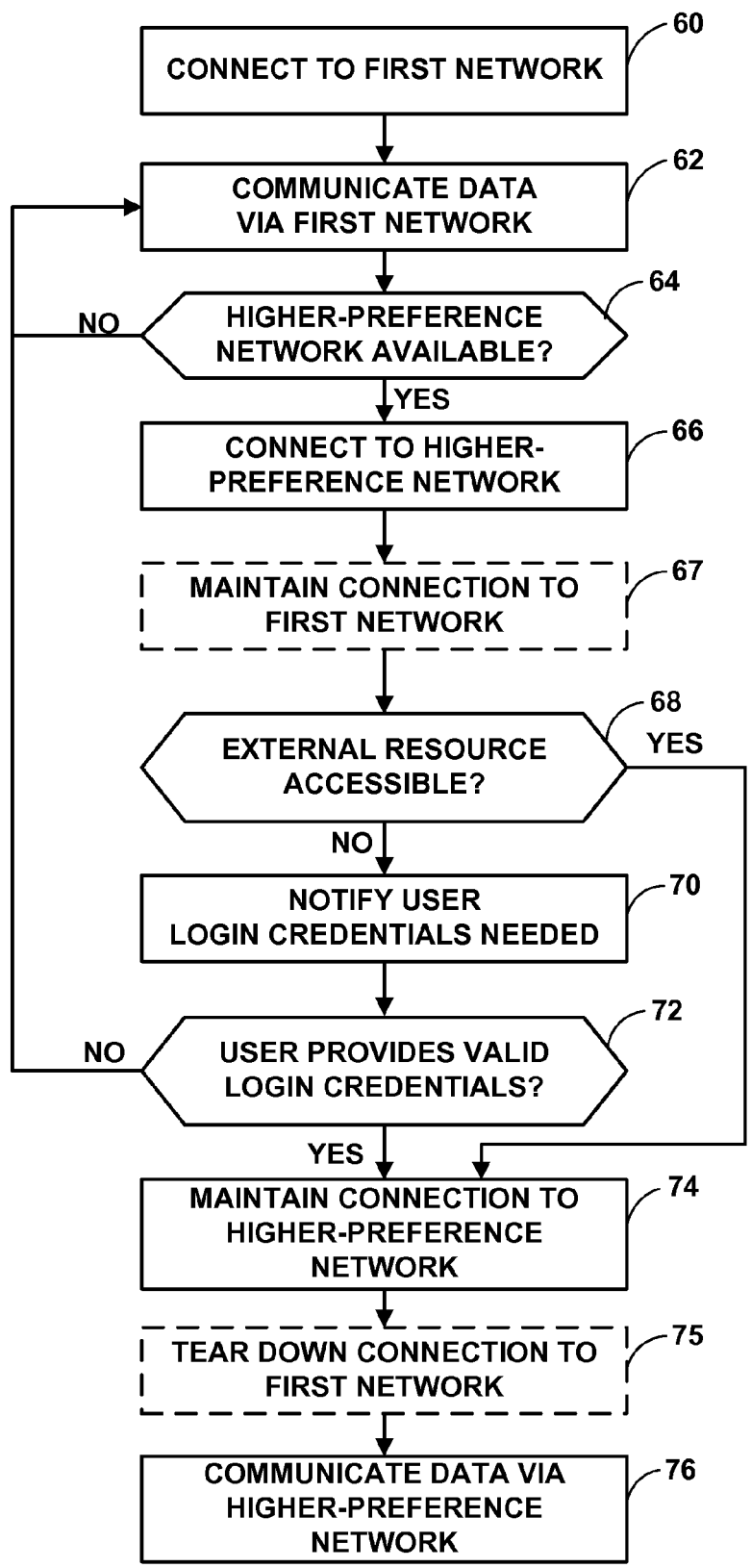
FIG. 3 is a flow chart illustrating an example method for determining whether to connect to a first network gateway of a first network or a second network gateway of a second, higher-preference network.

FIG. 3 is a flow chart illustrating an example method for determining whether to connect to a first network gateway of a first network or a second network gateway of a second, higher-preference network. The first network gateway may correspond to 3G Network Gateway 20, while the second network gateway may correspond to WLAN Network Gateway 22, in some examples. Although described for purposes of illustration with respect to the example of Mobile Device 30, it should be understood that the method of FIG. 3 may be performed by a variety of devices that are capable of connecting to either or both of two networks.

Initially, Mobile Device 30 connects to a first network gateway of a first network, such as 3G Network Gateway 20 (60). With respect to the example of FIG. 1, Mobile Device 30 may establish 3G Connection 24 with 3G Network Gateway 20. Mobile device 30 may then communicate data via the first network, e.g., the first network gateway (62). For example, Mobile Device 30 may attempt to retrieve e-mail for one or more e-mail accounts, retrieve web-based data, or perform other user-initiated or non-user-initiated network tasks.

Mobile device 30 may then determine whether there is a higher-preference network available (64). For example, Control Unit 40 may periodically cause WLAN Network Interface 36 to scan for available WLAN networks. If no WLAN network is detected ("NO" branch of 64), Mobile Device 30 may continue to communicate data via the first network (62). On the other hand, if a WLAN network is detected to which a connection can be established ("YES" branch of 64), Mobile Device 30 may connect to the WLAN network, in particular, to an network gateway of the WLAN network (66). In some examples, Mobile Device 30 may maintain the first connection (e.g., to the 3G network) when connecting to the higher-preference network (e.g., the WLAN network) (67). That is, while determining whether the resource is available via the higher-preference network, Mobile Device 30 may continue to communicate data using existing network sessions (which may have been initiated while connected to the first network) via the first network.

After connecting to the network gateway of the higher-preference network, Mobile Device 30 determines whether a resource external to the higher-preference network is accessible via the higher-preference network (68). One or more techniques may be used for determining whether an external resource is accessible via the higher-preference network. Various example techniques are described below with respect to the methods of FIGS. 4-8. Resource Availability Determination Module 46 may use one or more of these or other methods, or a combination thereof, to determine whether a resource external to the higher-preference network is accessible via the higher-preference network.

When the external resource is not accessible via the higher-preference network ("NO" branch of 68), Mobile Device 30 may prompt the user for login credentials requested by the network gateway of the higher-preference network (70). Mobile device 30 may also trigger one or more alerts for the user such as, for example, one or more audible alerts, visible alerts, and/or tactile alerts, and any combination thereof. Mobile device 30 may then wait for a period of time for the user to enter the login credentials. When the user does not provide valid login credentials within the period of time ("NO" branch of 72), Mobile Device 30 may disconnect from the WLAN network gateway and continue to communicate network session data via the first network. Mobile device 30 may also store an indication that Mobile Device 30 should not attempt to connect to the WLAN network gateway for at least a period of time, e.g., to prevent annoying a user or consumption of resources used in connecting to the WLAN network.

On the other hand, when the user provides login credentials within the period of time that are validated by the network gateway ("YES" branch of 72), or when the external resource was determined to be available ("YES" branch of 68), Mobile Device 30 may maintain the connection to the higher-preference network (74). That is, Mobile Device 30 may communicate data via the higher-preference network. In some examples, Mobile Device 30 may nevertheless continue to communicate data of existing network sessions via the first network, e.g., if Mobile Device 30 is capable of remaining connected to both the first network and the second, higher-preference network. In some examples, Mobile Device 30 may tear down the connection to the first network after determining that the resource is available via the higher-preference network and reestablish network sessions that were previously maintained on the first network via the higher-preference network (75). Mobile device 30 may, in either case, communicate data using new (and, in some cases, reestablished) network connections via the higher-preference network (76).

In this manner, FIG. 3 portrays an example of a method including maintaining, by a mobile device, a connection to a first network gateway of a first network, connecting, by the mobile device, to a second, different network gateway of a second, different network upon determining that the second network is both available and preferable over the first network, determining whether a resource external to the second network is currently accessible via the second network gateway, and, when the resource external to the second network is accessible via the second network gateway, maintaining the connection to the second network via the second network gateway. That is, the resource may be deemed currently accessible when the resource is accessible without providing application layer login credentials.

Figure 4:
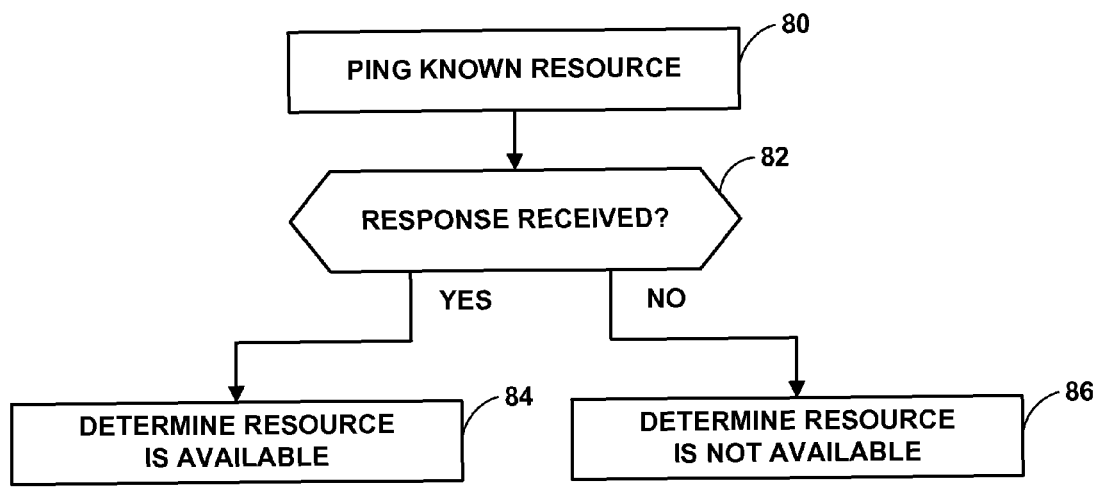
FIG. 4 is a flowchart illustrating an example method including pinging a known resource to determine whether an network gateway provides access to the Internet.

FIG. 4 is a flowchart illustrating an example method including pinging a known resource to determine whether an network gateway provides access to the Internet. In general, the method of FIG. 4 may be used to perform the determination act labeled 68 in FIG. 3. Initially, Resource Availability Determination Module 46 generates an ICMP echo request (also referred to as a ping request) and sends the echo request to the IP address of a known resource, e.g., Network Resource 12 (FIG. 1) via, e.g., WLAN Network Gateway 22 (80). In accordance with ICMP, Resource Availability Determination Module 46 then awaits an ICMP response (also referred to as a pong) from Network Resource 12 (82). That is, Resource Availability Determination Module 46 may wait for the ICMP response for a certain period of time.

When Resource Availability Determination Module 46 receives the ICMP response within the time period ("YES" branch of 82), Resource Availability Determination Module 46 determines that the known resource is available via WLAN Network Gateway 22 (84), which indicates that resources of Internet 10 are available via WLAN Network Gateway 22. On the other hand, when Resource Availability Determination Module 46 does not receive the ICMP response within the time period ("NO" branch of 82), Resource Availability Determination Module 46 determines that resources of Internet 10 are not available via WLAN Network Gateway 22 without additional login credentials (86).

Figure 5:
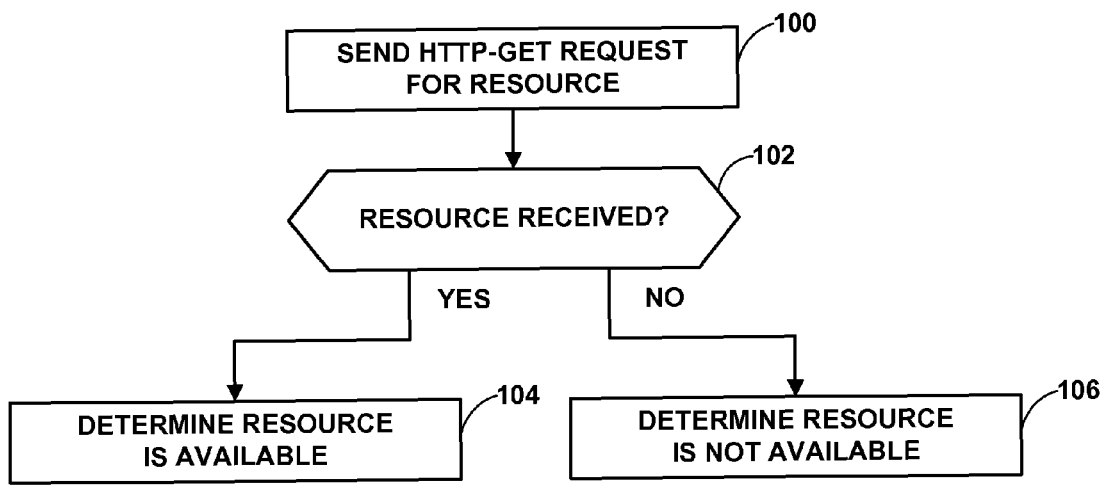
FIG. 5 is a flowchart illustrating an example including using HTTP-GET requests to determine whether an network gateway provides access to the Internet.

FIG. 5 is a flowchart illustrating an example including using HTTP-GET requests to determine whether an network gateway provides access to the Internet. In general, the method of FIG. 5 may be used to perform the determination act labeled 68 in FIG. 3. Resource Availability Determination Module 46 may construct an HTTP-GET or partial GET request for a known resource, such as all or a portion of Network Resource 12, and submit the request via WLAN Network Gateway 22 (100). Resource Availability Determination Module 46 then awaits a response to the request (102).

When Resource Availability Determination Module 46 receives the requested resource ("YES" branch of 102), Resource Availability Determination Module 46 determines that resources of Internet 10 are available via WLAN Network Gateway 22 (104). On the other hand, when Resource Availability Determination Module 46 does not receive the requested resource ("NO" branch of 102), Resource Availability Determination Module 46 determines that resources of Internet 10 are not available without additional login credentials (106).

Figure 6:
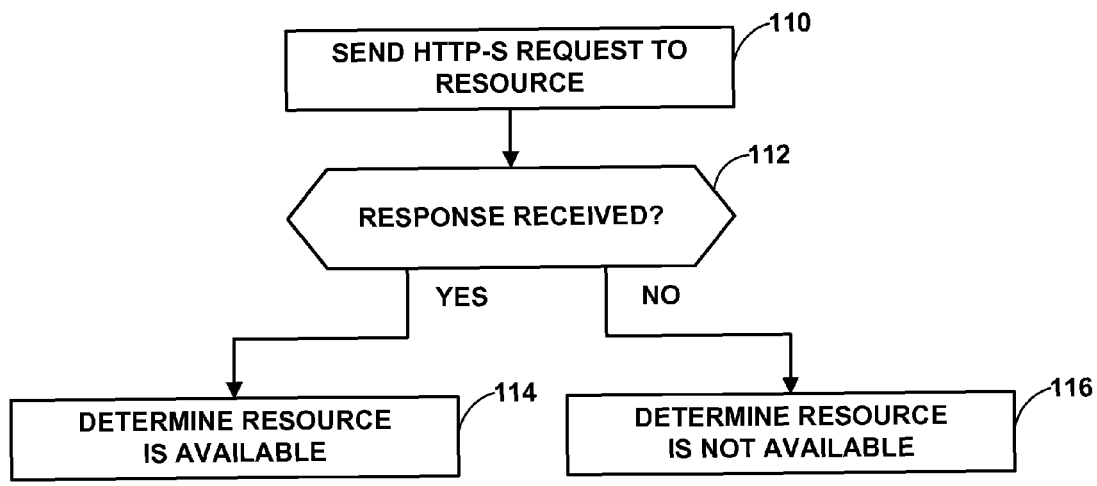
FIG. 6 is a flowchart illustrating an example including using HTTP-S to determine whether an network gateway provides access to the Internet.

FIG. 6 is a flowchart illustrating an example including using HTTP-S to determine whether an network gateway provides access to the Internet. In general, the method of FIG. 6 may be used to perform the determination act labeled 68 in FIG. 3. Resource Availability Determination Module 46 constructs a request in accordance with HTTP-S and sends the HTTP-S request via WLAN Network Gateway 22 (110). Resource Availability Determination Module 46 then awaits a response to the HTTP-S request (112).

When Resource Availability Determination Module 46 receives a response to the HTTP-S request from Network Resource 12 ("YES" branch of 112), Resource Availability Determination Module 46 determines that resources of Internet 10 are available via WLAN Network Gateway 22 (114). On the other hand, when Resource Availability Determination Module 46 does not receive a response to the HTTP-S request from Network Resource 12 ("NO" branch of 114), Resource Availability Determination Module 46 determines that resources of Internet 10 are not available via WLAN Network Gateway 22 without additional login credentials (116).

Figure 7:
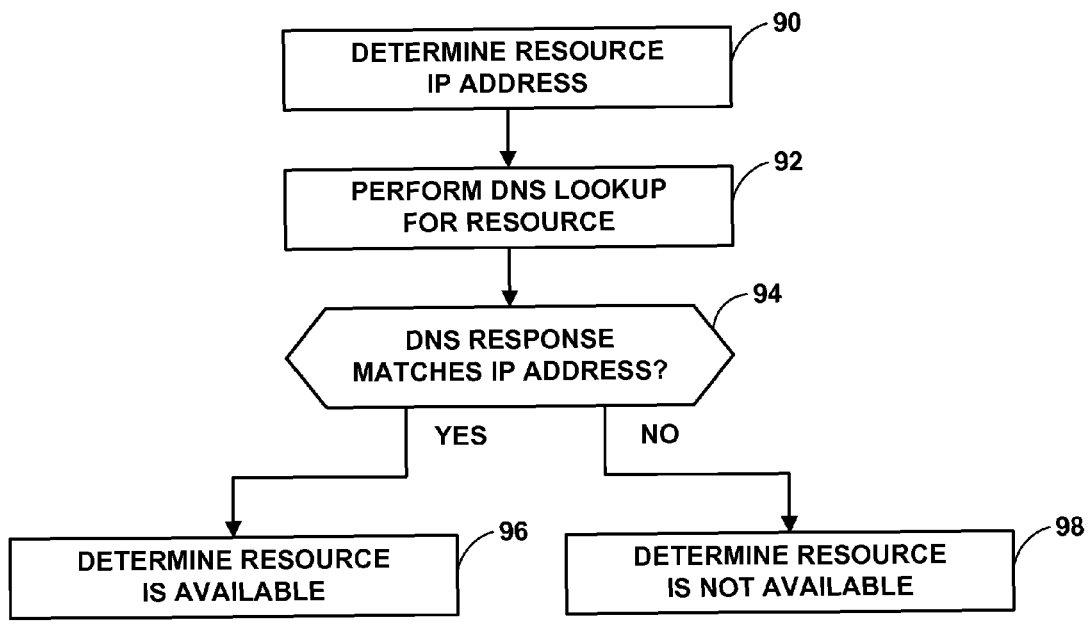
FIG. 7 is a flowchart illustrating an example method including using DNS lookups to determine whether an network gateway provides access to the Internet.

FIG. 7 is a flowchart illustrating an example method including using DNS lookups to determine whether an network gateway provides access to the Internet. In general, the method of FIG. 7 may be used to perform the determination act labeled 68 in FIG. 3. Initially, Resource Availability Determination Module 46 determines an IP address of a known resource, such as Network Resource 12 (90). The IP address of Network Resource 12 may be stored in Known Resource Characteristics 48 (FIG. 2). Resource Availability Determination Module 46 may then construct a DNS lookup request for Network Resource 12 and send the DNS lookup request via WLAN Network Gateway 22 (92).

In response to the DNS lookup, Resource Availability Determination Module 46 receives a DNS response including an IP address. Resource Availability Determination Module 46 may then compare the IP address in the DNS response to the determined IP address of known resource 12 (94). When the IP addresses match ("YES" branch of 94), Resource Availability Determination Module 46 determines that resources of Internet 10 are accessible via WLAN Network Gateway 22 (96). On the other hand, when the IP addresses do not match, Resource Availability Determination Module 46 determines that resources of Internet 10 are not available via WLAN Network Gateway 22 without additional login credentials (98).

Figure 8:
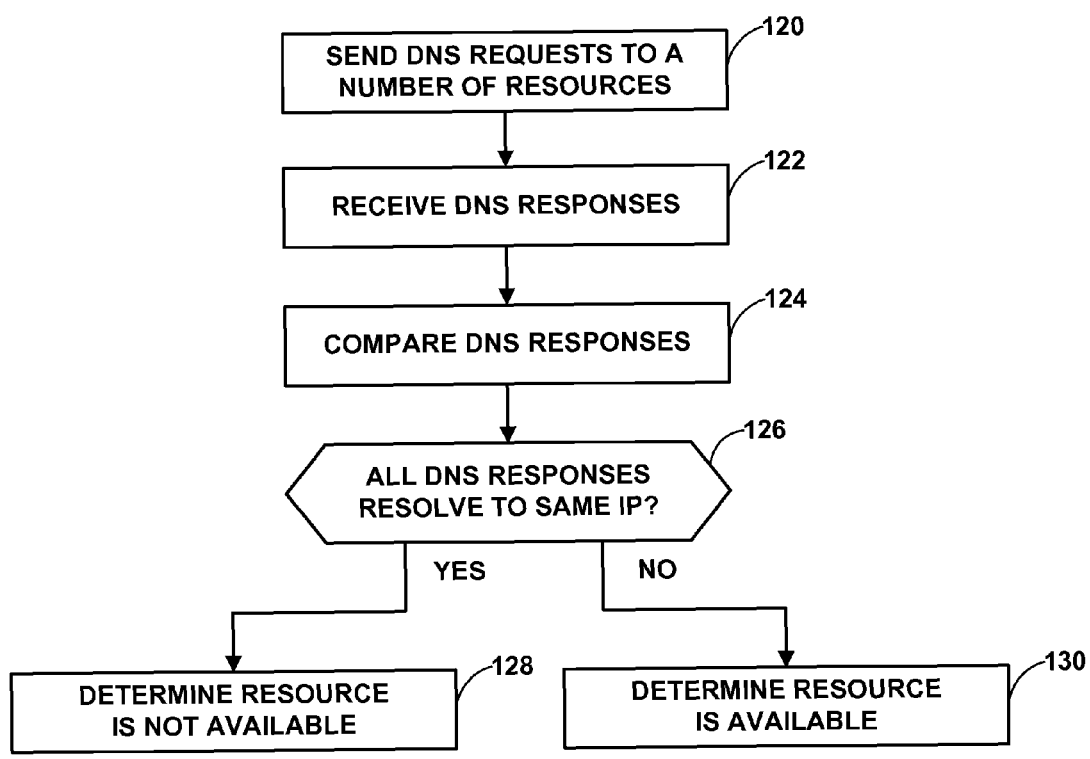
FIG. 8 is a flowchart illustrating an example including sending DNS requests to various network resources to determine whether an network gateway provides access to the Internet.

FIG. 8 is a flowchart illustrating an example including sending DNS requests to various network resources to determine whether an network gateway provides access to the Internet. In general, the method of FIG. 8 may be used to perform the determination act labeled 68 in FIG. 3. Initially, Resource Availability Determination Module 46 generates and sends a number of DNS requests to a number of various network resources of Internet 10, one of which may include Network Resource 12 (120). Resource Availability Determination Module 46 may then receive responses to the DNS requests, each including an IP address (122). Resource Availability Determination Module 46 may then compare the IP addresses of the DNS responses to each other (124).

In general, two or more of the IP addresses being the same indicates that the DNS requests did not pass WLAN Network Gateway 22, and as such, that WLAN Network Gateway 22 provides a walled garden. In the example of FIG. 8, Resource Availability Determination Module 46 determines whether all of the IP addresses of the DNS responses resolve to the same IP address (126). In other examples, Resource Availability Determination Module 46 may determine whether at least two of the IP addresses of the DNS responses resolve to the same IP address.

In the example of FIG. 8, when all of the IP addresses of the DNS responses are the same ("YES" branch of 126), Resource Availability Determination Module 46 determines that resources of Internet 10 are not accessible via WLAN Network Gateway 22 (128). On the other hand, when at least two of the IP addresses of the DNS responses are different, Resource Availability Determination Module 46 determines that resources of Internet 10 are accessible via WLAN network gateway 10 (130).

FIGS. 4-8 provide various examples for determining whether a network resource external to WLAN Network Gateway 22 (and WLAN network 18) is accessible via WLAN Network Gateway 22. In some examples, Resource Availability Determination Module 46 may use one or more of the methods of FIGS. 4-8, and/or other methods, to determine whether WLAN Network Gateway 22 provides a walled garden, that is, that WLAN Network Gateway 22 requires additional login credentials before providing access to resources of Internet 10 generally. For example, Resource Availability Determination Module 46 may perform a combination of the methods of FIGS. 4-8 and (in various examples) when any one of the methods, a certain subset of the methods, or all of the methods indicate that WLAN Network Gateway 22 provides a walled garden, Resource Availability Determination Module 46 determines that resources of Internet 10 are not accessible via WLAN Network Gateway 22 without additional login credentials.

As noted above, the description of the techniques of this disclosure with respect to 3G and WLAN networks is merely for purposes of example and explanation. Any type of network gateway may provide a walled garden, that is, enable a mobile device to connect, without providing access to resources of Internet 10 generally unless the mobile device provides additional credentials, such as a username and password. Accordingly, the techniques of this disclosure may be applied to any two or more network connection types generally to determine to which of the networks to connect.

Furthermore, although described with respect to a mobile device for purposes of explanation, the techniques of this disclosure may generally be performed by any network device. That is, any network device capable of connecting to various network gateways, e.g., according to various OSI Model layer two protocols, may implement the techniques of this disclosure. Thus the term "network device" may include devices, such as personal computers, embedded systems, cellular telephones, smart phones, personal digital assistants, tablet computers, laptop computers, and any other computing device.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FP- GAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media.

Various examples have been described. These and other examples are within the scope of the following claims.

The invention claimed is:

1. A method comprising:
   maintaining, by a mobile device, a connection to a first network gateway, wherein data of existing network sessions are communicated via the first network gateway;
   determining that a second, different network gateway is both available and preferable over the first network gateway;
   connecting, by the mobile device, to the second network gateway independently of the first network gateway while maintaining the connection to the first network gateway;
   determining whether an application on the mobile device can access a remote network resource through the second network gateway, wherein the remote network resource is external to the first network gateway and the second network gateway;
   when the application on the mobile device can access the remote network resource through the second network gateway, the method comprises:
      maintaining the connection to the second network gateway;
      terminating the existing network sessions communicated via the first network gateway; and
      reinitiating the terminated network sessions via the second network gateway; and
   when the application on the mobile device cannot access the remote network resource through the second network gateway, the method comprises:
      disconnecting from the second network gateway while maintaining the connection to the first network gateway.

2. The method of claim 1, wherein when the application on the mobile device can access the remote network resource through the second network gateway, the method further comprises: disconnecting from the first network gateway.

3. The method of claim 1, wherein determining whether the application can access the remote network resource through the second network gateway comprises:
   sending an Internet Control Message Protocol (ICMP) echo request packet to the resource via the second network gateway; and
   determining that the resource is accessible via the second network gateway upon receiving an ICMP response from the resource.

4. The method of claim 1, wherein determining whether the application can access the remote network resource through the second network gateway comprises:
   determining a resource Internet protocol (IP) address comprising an IP address of the remote network resource;
   performing a Domain Name System lookup for the remote network resource via the second network gateway to receive a responsive IP address; and
   determining that the remote network resource is accessible via the second network gateway when the remote network resource IP address matches the responsive IP address.

5. The method of claim 1, wherein determining whether the application can access the remote network resource through the second network gateway comprises:
   sending a hypertext transfer protocol (HTTP) streaming GET request for the remote network resource via the second network gateway; and
   determining that the remote network resource is accessible when the remote network resource is received in response to the HTTP streaming GET request.

6. The method of claim 1, wherein determining whether the application can access the remote network resource through the second network gateway comprises:
   sending a hypertext transfer protocol (HTTP-S) request to the remote network resource via the second network gateway; and
   determining that the remote network resource is accessible upon receiving a response to the HTTP-S request from the remote network resource.

7. The method of claim 1, wherein the remote network resource comprises one of a plurality of resources that are each external to the second network gateway, and wherein determining whether the application can access the remote network resource through the second network gateway comprises:
   sending domain name system (DNS) requests to each of the plurality of resources; and
   determining that the remote network resource is accessible when at least two responses to the DNS requests resolve to different Internet protocol addresses.

8. A non-transitory computer-readable storage medium comprising instructions that, when executed, cause a processor of a mobile device to:
   maintain a connection to a first network gateway, wherein data of existing network sessions are communicated via the first network gateway;
   determine that a second, different network gateway is both available and preferable over the first network gateway;

connect to the second network gateway independently of the first network gateway while maintaining the connection to the first network gateway;

determine whether an application on the mobile device can access a remote network resource through the second network gateway, wherein the remote network resource is external to the first network gateway and the second network gateway;

when the application on the mobile device can access the remote network resource through the second network gateway, the instructions cause the processor to:
maintain the connection to the second network gateway;
terminate the existing network sessions communicated via the first network gateway; and
reinitiate the terminated network sessions via the second network gateway; and when the application on the mobile device cannot access the remote network resource through the second network gateway, the instructions cause the processor to:
disconnect from the second network gateway while maintaining the connection to the first network gateway.

9. The non-transitory computer-readable storage medium of claim 8, when the application on the mobile device can access the remote network resource, the instructions cause the processor to:
initiate new network sessions through the second network gateway.

10. The non-transitory computer-readable storage medium of claim 8, wherein the instructions that cause the processor to determine whether the application can access the remote network resource through the second network gateway comprise instructions those cause the processor to:
send an Internet Control Message Protocol (ICMP) echo request packet to the remote network resource through the second network gateway; and
determine that the remote network resource is accessible through the second network gateway upon receiving an ICMP response from the remote network resource.

11. The non-transitory computer-readable storage medium of claim 8, wherein the remote network resource comprises one of a plurality of resources that are each external to the second network gateway, and wherein the instructions that cause the processor to determine whether the application can access the remote network resource through the second network gateway comprise instructions that cause the processor to:
send domain name system (DNS) requests to each of the plurality of resources; and
determine that the remote network resource is accessible when at least two responses to the DNS requests resolve to different Internet protocol addresses.

12. A method comprising:
maintaining, by a mobile device, a connection to a first network gateway, wherein data of existing network sessions are communicated via the first network gateway;
determining that a second, different network gateway is both available and preferable over the first network gateway;
connecting, by the mobile device, to the second network gateway independently of the first network gateway while maintaining the connection to the first network gateway; and
determining whether an application on the mobile device can access a remote network resource through the second network gateway, wherein the remote network resource is external to the first network gateway and the second network gateway, wherein when the remote network resource is determined to be currently accessible through the second network gateway, the method comprises:
maintaining the connection to the second network gateway;
terminating the existing network sessions communicated via the first network gateway; and
reinitiating the terminated network sessions via the second network gateway, and wherein when the remote network resource is not determined to be currently accessible through the second network gateway, the method comprises:
displaying a prompt for authentication credentials for the second network gateway;
waiting to receive the authentication credentials; and
disconnecting from the second network gateway when the authentication credentials are not received after a predetermined amount of time.

13. The method of claim 12, wherein when the remote network resource is not determined to be currently accessible through the second network gateway, the method further comprises providing the authentication credentials to the second network gateway upon receiving the authentication credentials within the predetermined amount of time.

14. A method comprising:
maintaining, by a mobile device, a connection to a first network gateway, wherein data of existing network sessions are communicated via the first network gateway;
determining that a second, different network gateway is both available and preferable over the first network gateway;
connecting, by the mobile device, to the second network gateway independently of the first network gateway while maintaining the connection to the first network gateway;
determining whether an application on the mobile device cannot access a remote network resource through the second network gateway, wherein the remote network resource is external to the first network gateway and the second network gateway;

when the application on the mobile device cannot access the remote network resource through the second network gateway, the method comprises:
prompting for authentication credentials for the second network gateway; and when the application on the mobile device can access the remote network resource through the second network gateway, the method comprises:
maintaining the connection to the second network gateway;
terminating the existing network sessions communicated via the first network gateway; and
reinitiating the terminated network sessions via the second network gateway.

15. The method of claim 14, when the application on the mobile device cannot access the remote network resource through the second network gateway, the method further comprises:
disconnecting from the second network gateway when the authentication credentials are not received after a predetermined amount of time.

16. The method of claim 15, when the application on the mobile device cannot access the remote network resource through the second network gateway, the method further comprises:
providing the authentication credentials to the second network gateway upon receiving the authentication credentials within the predetermined amount of time.

* * * * *